(12) United States Patent
Ausserlechner

(10) Patent No.: US 8,575,920 B2
(45) Date of Patent: Nov. 5, 2013

(54) MAGNETO-RESISTIVE MAGNETIC FIELD SENSOR

(75) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 721 days.

(21) Appl. No.: 11/950,618

(22) Filed: Dec. 5, 2007

(65) Prior Publication Data

US 2009/0146647 A1    Jun. 11, 2009

(51) Int. Cl.
*G01B 7/30* (2006.01)
(52) U.S. Cl.
USPC .................. 324/207.21; 324/207.25; 324/174
(58) Field of Classification Search
USPC ................................ 324/174, 207.21, 207.25
See application file for complete search history.

(56) References Cited

U.S. PATENT DOCUMENTS

| | | | |
|---|---|---|---|
| 4,712,064 A | 12/1987 | Eckardt et al. | |
| 5,038,130 A | 8/1991 | Eck et al. | |
| 5,210,489 A | 5/1993 | Petersen | |
| 6,014,023 A * | 1/2000 | Yokotani et al. | 324/207.21 |
| 6,140,813 A * | 10/2000 | Sakanoue et al. | 324/174 |
| 6,194,893 B1 * | 2/2001 | Yokotani et al. | 324/207.21 |
| 6,255,811 B1 | 7/2001 | Hatazawa et al. | |
| 6,639,399 B2 * | 10/2003 | Schroeder et al. | 324/207.25 |
| 7,009,384 B2 * | 3/2006 | Heremans et al. | 324/165 |
| 7,019,950 B2 | 3/2006 | Heim et al. | |
| 7,112,955 B2 | 9/2006 | Buchhold | |
| 7,112,957 B2 | 9/2006 | Bicking | |
| 2007/0075705 A1 | 4/2007 | Kurumado | |

FOREIGN PATENT DOCUMENTS

| | | |
|---|---|---|
| DE | 3041041 A1 | 5/1982 |
| EP | 0357200 A3 | 3/1990 |
| WO | 2005088259 | 9/2005 |

* cited by examiner

*Primary Examiner* — Jay Patidar
(74) *Attorney, Agent, or Firm* — Dicke, Billig & Czaja, PLLC

(57) ABSTRACT

A system includes a magnet, a first magneto-resistive sensing element, and a second magneto-resistive sensing element. The magnet is configured to provide a magnetic field having a substantially non-diverging magnetic field line and diverging magnetic field lines. The first magneto-resistive sensing element is situated in the magnetic field. The second magneto-resistive sensing element is situated in the magnetic field. The first magneto-resistive sensing element is intersected at a centerline of the first magneto-resistive sensing element by the substantially non-diverging magnetic field line. The second magneto-resistive sensing element is intersected by only the diverging magnetic field lines of the magnetic field.

6 Claims, 7 Drawing Sheets

MAGNETO-RESISTIVE MAGNETIC FIELD SENSOR

BACKGROUND

Typically, magneto-resistive (XMR) sensors include a supporting magnet and one or more XMR sensor elements for measuring a magnetic field. The supporting magnet and the XMR sensor elements are in a fixed position relative to each other. The XMR sensor elements do not usually operate in their saturation range and the supporting magnet provides a back bias magnetic field that is superimposed on the XMR sensor elements. The supporting magnet acts as a source of the magnetic field and for some types of XMR sensor elements, such as anisotropic magneto-resistive (AMR) sensor elements, the magnetic field stabilizes the transfer characteristic of the XMR sensor elements. As the position of a detected object changes relative to the source of the magnetic field, the magnetic field produces a proportional voltage signal in the XMR sensor elements. Suitable XMR sensor elements include AMR sensor elements, giant magneto-resistive (GMR) sensor elements, tunneling magneto-resistive (TMR) sensor elements, and colossal magneto-resistive (CMR) sensor elements. XMR sensors can be used as proximity sensors, motion sensors, position sensors, or speed sensors.

Often, in speed sensors, a permanent magnet is attached to a magnetic field sensor that includes multiple XMR sensor elements. The magnetic field sensor is placed in front of a toothed magnetically permeable wheel or disk. As the disk rotates, the teeth pass in front of the magnetic field sensor and generate small field variations in the magnetic field. These small field variations are detected by the XMR sensor elements and include information about rotational speed and angular position of the rotating disk.

However, diverging magnetic field lines of the back bias magnetic field may provide components that affect the XMR sensor elements. Even if the toothed wheel or gear wheel is symmetrically aligned with the XMR sensor elements, where a tooth center or gap center is directly between the XMR sensor elements and in the middle of the back bias magnetic field, the diverging magnetic field lines may drive the XMR sensor elements into saturation and render the XMR sensor elements useless for detecting variations in the magnetic field.

For these and other reasons there is a need for the present invention.

SUMMARY

One embodiment described in the disclosure provides a system including a magnet, a first magneto-resistive sensing element, and a second magneto-resistive sensing element. The magnet is configured to provide a magnetic field. The first magneto-resistive sensing element is situated in the magnetic field and the second magneto-resistive sensing element is situated in the magnetic field. The second magneto-resistive sensing element is laterally a greater distance from vertical magnetic field lines of the magnetic field than the first magneto-resistive sensing element.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
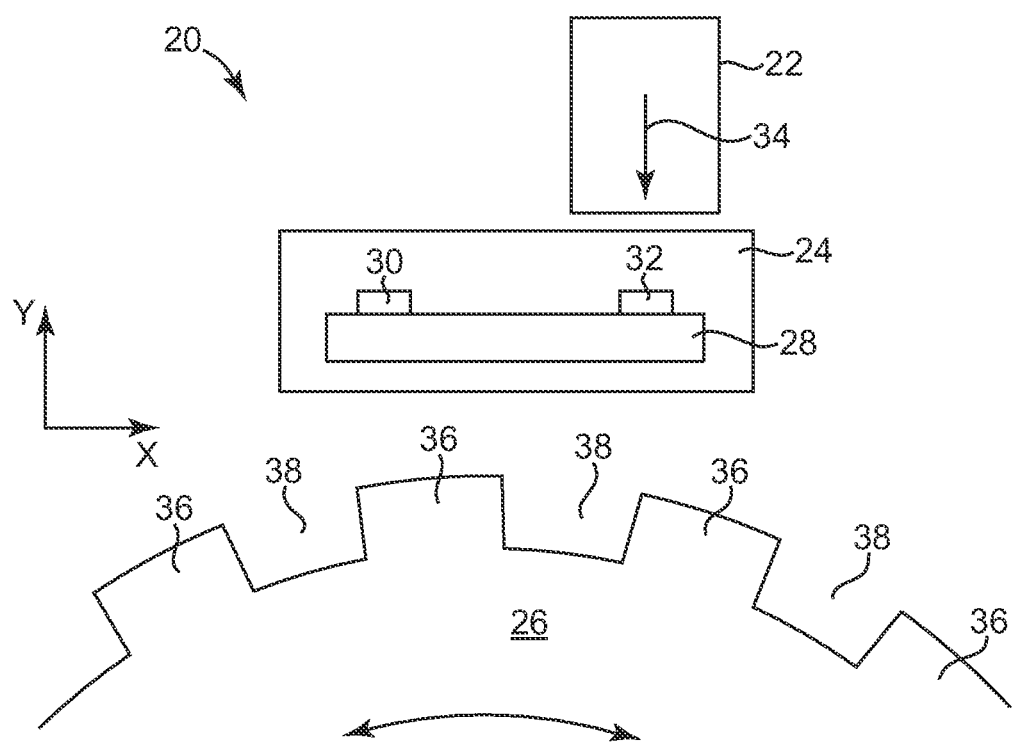
FIG. 1 is a diagram illustrating one embodiment of an XMR speed sensor.

FIG. 1 is a diagram illustrating one embodiment of an XMR speed sensor 20. A permanent magnet 22 is situated next to a magnetic field sensor 24 that is in spaced apart relation to a toothed magnetically permeable wheel or disk 26. Permanent magnet 22 and magnetic field sensor 24 are held in a fixed position relative to each other. In one embodiment, magnetic field sensor 24 and toothed magnetically permeable disk 26 are held in a fixed position relative to each other. In other embodiments, permanent magnet 22 and magnetic field sensor 24 can be used in another suitable sensor, such as a proximity sensor, a motion sensor, or a position sensor.

Magnetic field sensor 24 includes a sensor circuit 28 that includes a first XMR sensor element 30 and a second XMR sensor element 32. Permanent magnet 22 and first and second XMR sensor elements 30 and 32 are held in a fixed position relative to each other. In one embodiment, sensor circuit 28 is an integrated circuit chip. In one embodiment, each of the first and second XMR sensor elements 30 and 32 is an AMR sensor element. In one embodiment, each of the first and second XMR sensor elements 30 and 32 is a GMR sensor element. In one embodiment, each of the first and second XMR sensor elements 30 and 32 is a TMR sensor element. In one embodiment, each of the first and second XMR sensor elements 30 and 32 is a CMR sensor element.

Permanent magnet 22 provides a back bias magnetic field 34 that is superimposed on first and second XMR sensor elements 30 and 32. Magnetic field 34 provides diverging magnetic field lines that flow through first XMR sensor element 30. The diverging magnetic field lines through first XMR sensor element 30 have non-zero x-direction and y-direction components. Magnetic field 34 provides magnetic field lines that flow through second XMR sensor element 32 in the y-direction. The magnetic field lines that flow through second XMR sensor element 32 have an x-direction component magnitude that is less than the magnitude of the x-direction component through first XMR sensor element 30. In one embodiment, the magnetic field lines that flow through second XMR sensor element 32 have an x-direction component that is substantially equal to zero. In one embodiment, the magnetic field lines that flow through second XMR sensor element 32 have an x-direction component that is non-zero, but the magnitude is less than the magnitude of the x-component through first XMR sensor element 30. In one embodiment, first XMR sensor element 30 is saturated and second XMR sensor element 32 operates in an unsaturated or active region of the sensor element. In other embodiments, each of the first and second XMR sensor elements 30 and 32 operate in the unsaturated or active region of the sensor element.

Toothed magnetically permeable disk 26 includes teeth 36 and gaps 38. Disk 26 rotates in a clockwise direction or a counter-clockwise direction.

In operation, as disk 26 rotates the teeth 36 and gaps 38 pass through magnetic field 34 and create magnetic field variations in magnetic field 34. The magnetic field variations include x-direction components that are detected via second XMR sensor element 32. These magnetic field variations include information about rotational speed and angular position of rotating disk 26.

Speed sensor 20 includes permanent magnet 22 positioned to provide magnetic field lines that flow through second XMR sensor element 32 and have an x-direction component magnitude that is less than the magnitude of the x-direction component through first XMR sensor element 30. Thus, second XMR sensor element 32 is unsaturated and biased to detect variations in magnetic field 34. Also, the first and second XMR sensor elements 30 and 32 can be put in a sensor bridge to detect variations in magnetic field 34.

Figure 2:
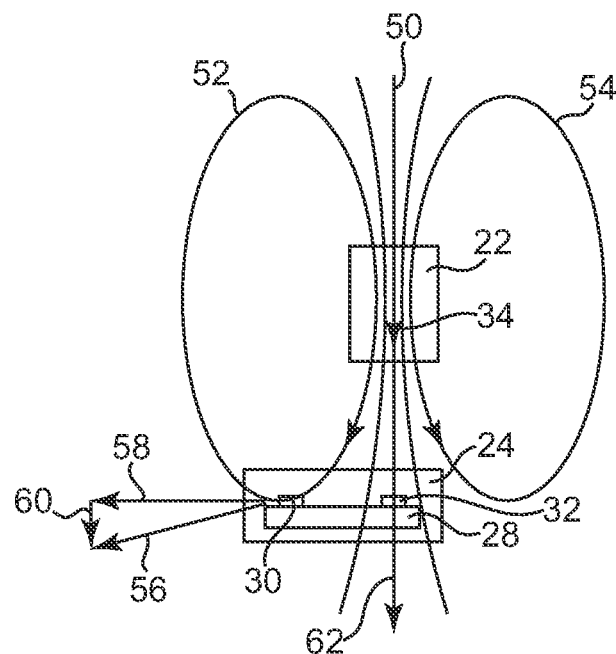
FIG. 2 is a diagram illustrating one embodiment of a permanent magnet and magnetic field lines that flow through a magnetic field sensor.

FIG. 2 is a diagram illustrating one embodiment of permanent magnet 22 and magnetic field lines that flow through magnetic field sensor 24. Permanent magnet 22 and magnetic field sensor 24 are spaced apart and in a fixed position relative to each other. Magnetic field sensor 24 includes sensor circuit 28 that includes first XMR sensor element 30 and second XMR sensor element 32. Permanent magnet 22 and first and second XMR sensor elements 30 and 32 are also spaced apart and in a fixed position relative to each other.

Permanent magnet 22 provides back bias magnetic field 34 that is superimposed on first and second XMR sensor elements 30 and 32. Magnetic field 34 provides substantially non-diverging magnetic field lines, such as magnetic field line 50, that flow through second XMR sensor element 32. Magnetic field 34 also provides diverging magnetic field lines, such as diverging magnetic field line 52 that flows through first XMR sensor element 30 and diverging magnetic field line 54.

The magnetic field through first XMR sensor element 30 is represented via magnetic field vector 56, which includes a negative non-zero x-component 58 and a negative non-zero y-component 60. The diverging magnetic field lines, such as diverging magnetic field line 52, include negative non-zero x-component 58 that negatively saturates first XMR sensor element 30. The negatively saturated first XMR sensor element 30 provides a minimum resistance value.

The magnetic field through second XMR sensor element 32 is represented via magnetic field vector 62, which includes an x-component that is substantially zero and a negative non-zero y-component. In one embodiment, second XMR sensor element 32 is an AMR sensor element and the non-zero y-component of magnetic field vector 62 biases second XMR sensor element 32.

Thus, first XMR sensor element 30 is saturated and second XMR sensor element 32 operates in the unsaturated region of the sensor element. In other embodiments, permanent magnet 22 can be turned around to provide a magnetic field having magnetic field lines that flow in the opposite direction, such that first XMR sensor element 30 is positively saturated to provide a maximum resistance value.

Due to material asymmetries in permanent magnet 22 and/or due to position tolerances of permanent magnet 22 relative to first and second XMR sensor elements 30 and 32, the x-component of the magnetic field through second XMR sensor element 32 may not be zero. However, it is possible to hold the x-component of the magnetic field through second XMR sensor element 32 within the unsaturated, dynamic range of second XMR sensor element 32.

In operation, second XMR sensor element 32 responds to magnetic field variations generated via rotating disk 26 and provides substantially sinusoidal resistance variations in the resistance of second XMR sensor element 32 in response to the magnetic field variations. First XMR sensor element 30 is saturated and remains saturated as disk 26 rotates.

The x-component of the magnetic field Bx that flows through first XMR sensor element 30 is Bx(xL) in Equation I and the x-component of the magnetic field Bx that flows through second XMR sensor element 32 is Bx(xR) in Equation II.

$$Bx(xL) = BxL + B0 * \sin(2\pi fpt + d\phi) \qquad \text{Equation I}$$

$$Bx(xR) = BxR + B0 * \sin(2\pi fpt - d\phi) \qquad \text{Equation II}$$

Where: BxL is a magnetic offset at first XMR sensor element 30; BxR is a magnetic offset at second XMR sensor element 32; B0 is an amplitude dependent on the air gap between magnetic field sensor 24 and disk 26; f is the rotational frequency of disk 26 in cycles per second; p is the number of teeth on disk 26; t is the time; and dphi is a phase shift that is dependent on the distance between first and second XMR sensor elements 30 and 32 and dependent on the widths of the teeth 36 and the widths of the gaps 38 between the teeth 36.

In one embodiment, BxR is equal to 0 and BxL is equal to 40 milli-Tesla (mT), where the value of a magnetic field that saturates a sensor element Bsat is 10 mT. Thus, first XMR sensor element 30 is saturated. Also, B0 is about 1 mT, such that first XMR sensor element 30 remains saturated and second XMR sensor element 32 operates in the unsaturated region and responds to magnetic field variations.

Figure 3:
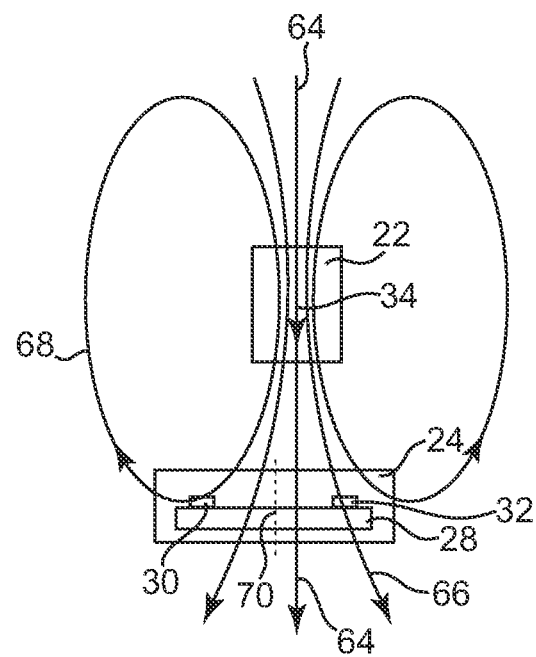
FIG. 3 is a diagram illustrating one embodiment of a permanent magnet having a vertical symmetry plane that is laterally offset from each of the XMR sensor elements.

FIG. 3 is a diagram illustrating one embodiment of permanent magnet 22 having a vertical symmetry plane at 64 that is laterally offset from each of the XMR sensor elements 30 and 32. Also, the vertical symmetry plane at 64 is laterally offset from a centerline 70 that is centered between first and second XMR sensor elements 30 and 32. First and second XMR sensor elements 30 and 32 are differently saturated, such that one of the first and second XMR sensor elements 30 and 32 is closer to saturation than the other one.

Permanent magnet 22 and magnetic field sensor 24 are spaced apart and in a fixed position relative to each other. Magnetic field sensor 24 includes sensor circuit 28 that includes first XMR sensor element 30 and second XMR sensor element 32. Permanent magnet 22 and first and second XMR sensor elements 30 and 32 are also spaced apart and in a fixed position relative to each other.

Permanent magnet 22 provides magnetic field 34 that is superimposed on first and second XMR sensor elements 30 and 32. Magnetic field 34 provides substantially non-diverging magnetic field lines, such as magnetic field line 64, in the vertical symmetry plane at 64. Magnetic field 34 provides diverging magnetic field lines, such as diverging magnetic field line 66 that flows through second XMR sensor element 32 and diverging magnetic field line 68 that flows through first XMR sensor element 30.

The magnitude of the x-component of magnetic field line 66 through second XMR sensor element 32 is less than the magnitude of the x-component of magnetic field line 68 through first XMR sensor element 30. Thus, first and second XMR sensor elements 30 and 32 are differently saturated, where first XMR sensor element 30 is closer to saturation than second XMR sensor element 32.

In one aspect, differently saturated and closer to saturation are defined by the vertical symmetry plane at 64 being laterally offset from centerline 70 by more than $\frac{1}{8}^{th}$ of the spacing between first and second XMR sensor elements 30 and 32.

In one aspect, differently saturated and closer to saturation are defined by the ratio of the magnitudes of the x-components of the magnetic fields through first and second XMR sensor elements 30 and 32, where the magnitude of the maximum magnetic field Bmax divided by the magnitude of the minimum magnetic field Bmin is greater than 2 and the magnitudes of the magnetic fields Bmax and Bmin are the magnitudes of the time averages of the magnetic fields through XMR sensor elements 30 and 32. In one embodiment, the time average of the magnetic field in operation is negative Bsat for first XMR sensor element 30 and zero for second XMR sensor element 32, as shown in FIG. 2. In one embodiment, the time average of the magnetic field in operation is (0.9*−Bsat) for first XMR sensor element 30 and (0.1*Bsat) for second XMR sensor element 32. In operation, second XMR sensor element 32 responds to magnetic field variations generated via rotating disk 26 and provides substantially sinusoidal resistance variations in the resistance of second XMR sensor element 32 in response to the magnetic field variations. In some embodiments, first XMR sensor element 30 also responds to magnetic field variations generated via rotating disk 26 and provides substantially sinusoidal resistance variations in the resistance of first XMR sensor element 30 in response to the magnetic field variations. In other embodiments, first XMR sensor element 30 is saturated and remains saturated as disk 26 rotates.

Figure 4:
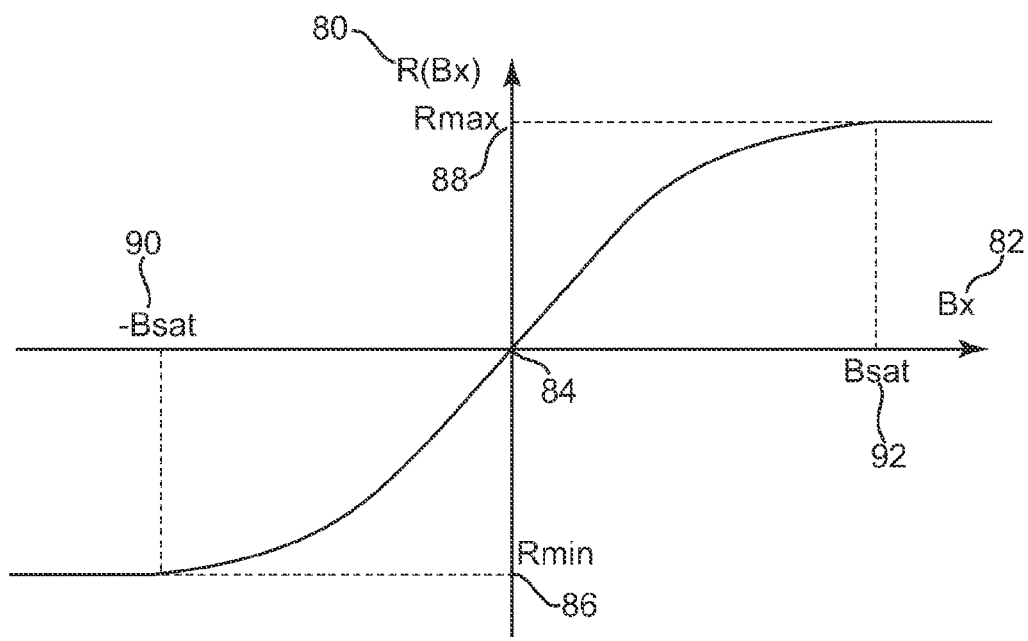
FIG. 4 is a diagram illustrating the resistance of an XMR sensor element versus the x-component of the magnetic field through the XMR sensor element.

FIG. 4 is a diagram illustrating the resistance of an XMR sensor element R(Bx) at 80 versus the x-component of the magnetic field through the XMR sensor element Bx at 82. The XMR sensor element is similar to each of the first and second XMR sensor elements 30 and 32.

At 84, the x-component of the magnetic field Bx is equal to zero and the resistance of the XMR sensor element R(0) is equal to a resistance that is half way between a minimum resistance of Rmin at 86 and a maximum resistance of Rmax at 88.

As the x-component of the magnetic field Bx becomes negative, the resistance of the XMR sensor element R(Bx) decreases. At 90, the x-component of the magnetic field Bx equals negative Bsat and the resistance of the XMR sensor element R(−Bsat) is substantially equal to Rmin at 86. As the x-component of the magnetic field Bx becomes positive, the resistance of the XMR sensor element R(Bx) increases. At 92, the x-component of the magnetic field Bx equals positive Bsat and the resistance of the XMR sensor element R(+Bsat) is substantially equal to Rmax at 88.

In one embodiment, first XMR sensor element 30 (shown in FIG. 2) is negatively saturated via the negative x-component 58 of magnetic field vector 56. This negative x-component 58 is less than negative Bsat at 90 and first XMR sensor element 30 provides the minimum resistance value Rmin at 86. Second XMR sensor element 32 is unsaturated and receives the sinusoidal x-component Bx(xR) of Equation II, which is between negative Bsat at 90 and positive Bsat at 92, to provide a resistance between Rmin at 86 and Rmax at 88. Second XMR sensor element 32 provides sinusoidal resistance changes in response to the magnetic field variations caused via rotating disk 26.

Figure 5:
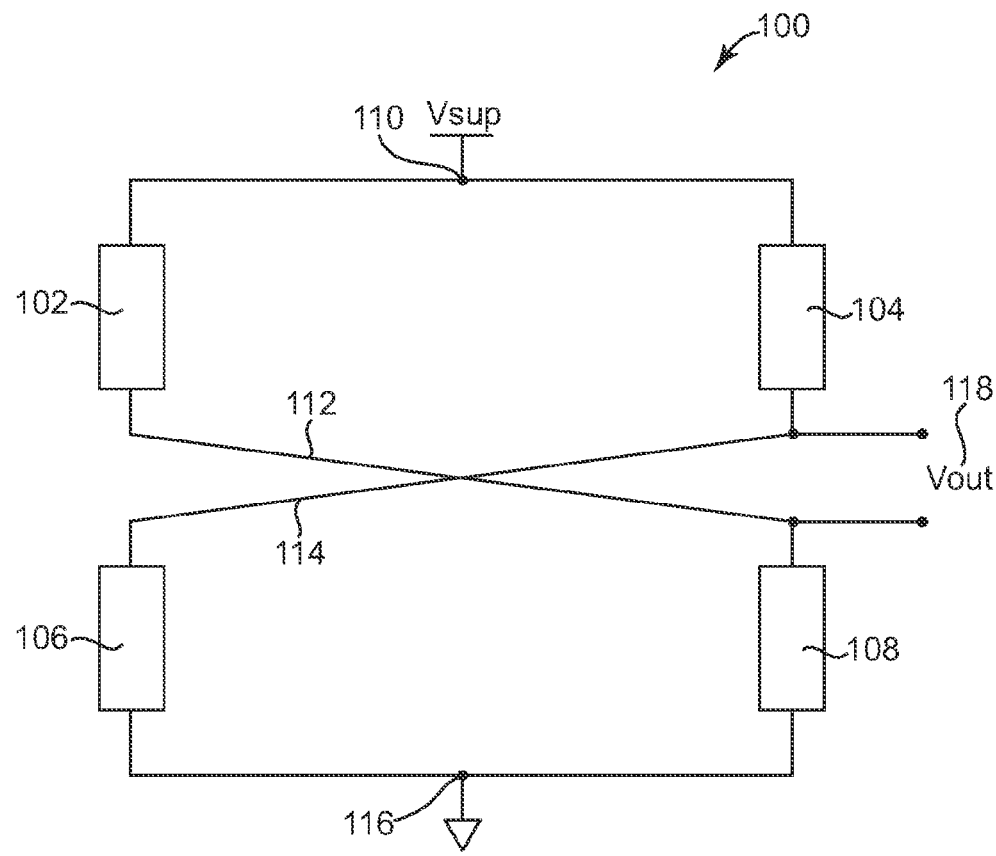
FIG. 5 is a diagram illustrating one embodiment of a sensor bridge.

FIG. 5 is a diagram illustrating one embodiment of a sensor bridge 100 that includes XMR sensor elements 102, 104, 106, and 108 for detecting magnetic field variations. Sensor bridge 100 is a sensor circuit in a magnetic field sensor that is in an XMR speed sensor, such as sensor circuit 28 in magnetic field sensor 24 that is in XMR speed sensor 20 of FIG. 1. Each of the XMR sensor elements 102, 104, 106, and 108 is similar to one of the XMR sensor elements 30 and 32. In other embodiments, sensor bridge 100 can be used in another suitable sensor, such as a proximity sensor, a motion sensor, or a position sensor.

Sensor bridge 100 has the topology of a Wheatstone bridge and includes first XMR sensor element 102, second XMR sensor element 104, third XMR sensor element 106, and fourth XMR sensor element 108. One side of first XMR sensor element 102 is electrically coupled to one side of second XMR sensor element 104 and to power supply voltage Vsup at 110. The other side of first XMR sensor element 102 is electrically coupled to one side of fourth XMR sensor element 108 via first bridge line 112. The other side of second XMR sensor element 104 is electrically coupled to one side of third XMR sensor element 106 via second bridge line 114. The other side of third XMR sensor element 106 is electrically coupled to the other side of fourth XMR sensor element 108 and to a reference, such as ground, at 116. First XMR sensor element 102 and fourth XMR sensor element 108 are part of one resistor divide network, and second XMR sensor element 104 and third XMR sensor element 106 are part of another resistor divide network. Sensor bridge 100 provides output voltage Vout at 118, which is the voltage difference between voltages on the first and second bridge lines 112 and 114.

Sensor bridge 100 is held in a spaced apart and fixed position relative to a permanent magnet, such as permanent magnet 22, and relative to a toothed magnetically permeable disk, such as disk 26. The magnetic field through each of the first and third XMR sensor elements 102 and 106 has a negative non-zero x-component and a non-zero y-component. The negative non-zero x-component negatively saturates first XMR sensor element 102 and third XMR sensor element 106. As a result, first XMR sensor element 102 provides a resistance R1 that is the minimum resistance Rmin and third XMR sensor element 106 provides a resistance R3 that is the minimum resistance Rmin, as shown in Equation III.

$$R1 = R3 = R\min \quad \text{Equation III}$$

The back bias magnetic field through each of the second and fourth XMR sensor elements 104 and 108 has an x-component that is substantially zero and a non-zero y-component. Second XMR sensor element 104 and fourth XMR sensor element 108 are unsaturated and operate in a dynamic region of the sensor element. Second XMR sensor element 104 provides resistance R2 and fourth XMR sensor element 108 provides resistance R4 in Equation IV.

$$R2 = R4 = R(Bx(xR)) = (R\max + R\min)/2 + \quad \text{Equation IV}$$
$$(R\max - R\min)/2 * \frac{B0}{B_{sat}} * \sin(2\pi fpt - d\varphi)$$

In operation, the toothed magnetically permeable disk rotates and generates magnetic field variations. Sensor bridge 100 detects the magnetic field variations and provides an output voltage Vout at 118 that varies according to Equation V.

$$Vout = Vsup * (R\min/(R\min + R(Bx(xR))) - \quad \text{Equation V}$$
$$R(Bx(xR))/(R\min + R(Bx(xR))))$$
$$= \left(\frac{R_{\min}}{R_{\min} + R(B_x(x_R))} - \frac{R(B_x(x_R))}{R_{\min} + R(B_x(x_R))}\right)$$
$$= V_{sup} \frac{\frac{R_{\max} - R_{\min}}{2}\left(-1 + \frac{B_0}{B_{sat}}\sin(2\pi ftp - d\varphi)\right)}{\frac{R_{\max} + 3R_{\min}}{2} + \frac{R_{\max} - R_{\min}}{2B}B_0 \sin(2\pi ftp - d\varphi)}$$
$$\cong V_{sup} \frac{R_{\max} - R_{\min}}{R_{\max} + 3R_{\min}}$$
$$\left(-1 + \frac{4R_{\min}}{R_{\max} + 3R_{\min}}\frac{B_0}{B_{sat}}\sin(2\pi ftp - d\varphi)\right)$$

The hub or stroke H of the XMR sensor elements 102, 104, 106, and 108 is given in Equation VI and substituted into Equation V to provide the output voltage Vout at 118 in Equation VII.

$$R\max/R\min = 1 + H \quad \text{Equation VI}$$

$$V_{out} \cong V_{sup} \frac{H}{4+H}\left(-1 + \frac{4}{4+H}\frac{B_0}{B_{sat}}\sin(2\pi ftp - d\varphi)\right) \quad \text{Equation VII}$$

A speed sensor including sensor bridge 100 can use a permanent magnet that does not include gaps or magnetic field focusing layers. The amplitude of the output voltage Vout at 118 is about ½ the amplitude of an output voltage provided via a sensor bridge that has unsaturated sensor elements on both sides of the bridge. In one embodiment, a signal conditioning circuit includes an amplification stage that amplifies output voltage Vout at 118 and reduces the signal-to-noise ratio. In one embodiment, a stronger permanent magnet is used to increase the amplitude of output voltage Vout at 118.

Also, the output voltage Vout at 118 includes the offset voltage Voffset in Equation VIII.

$$V_{offset} = V_{sup}\frac{-H}{(4+H)} \quad \text{Equation VIII}$$

In one embodiment, the supply voltage Vsup=1.5 volts and H=0.1, such that Voffset is equal to −37 milli-volts.

The offset voltage Voffset can be reduced or eliminated via the design of the sensor bridge. In one embodiment, the offset voltage Voffset is reduced or eliminated via increasing the resistance of the XMR sensor elements that are in negative saturation. The increase should be a factor of about (1+H/2) with respect to the unsaturated XMR sensor elements in the sensor bridge. In one embodiment, the offset voltage Voffset is reduced or eliminated via decreasing the resistance of the unsaturated XMR sensor elements with respect to the XMR sensor elements in negative saturation. In one embodiment, the offset voltage Voffset is reduced or eliminated via decreasing the resistance of the XMR sensor elements in positive saturation. The decrease should be a factor of about (1-H/2) with respect to the unsaturated XMR sensor elements in the sensor bridge. In one embodiment, the offset voltage Voffset is reduced or eliminated via increasing the resistance of the unsaturated XMR sensor elements with respect to the XMR sensor elements in positive saturation.

Resistances can be increased and decreased via selectively shunting in and out XMR sensor elements in series with other XMR sensor elements. In one embodiment, XMR sensor elements are shunted in and out via fusible links. In one embodiment, XMR sensor elements are shunted in and out via metal oxide semiconductor (MOS) switches.

In other embodiments, the sensor that includes sensor bridge 100 can have a testmode that outputs the offset voltage Voffset. The permanent magnet is positioned in relation to the magnetic field sensor that includes the sensor bridge to reduce or eliminate the offset voltage Voffset and to maintain unsaturated XMR sensor elements on at least one side of the sensor bridge. This can be done without the magnetically permeable disk in place or with the disk in place and in a symmetric position relative to the XMR sensor elements. Also, this can be done with a uniformly rotating disk, where the voltage offset Voffset is the time average over an integer multiple of periods.

Figure 6:
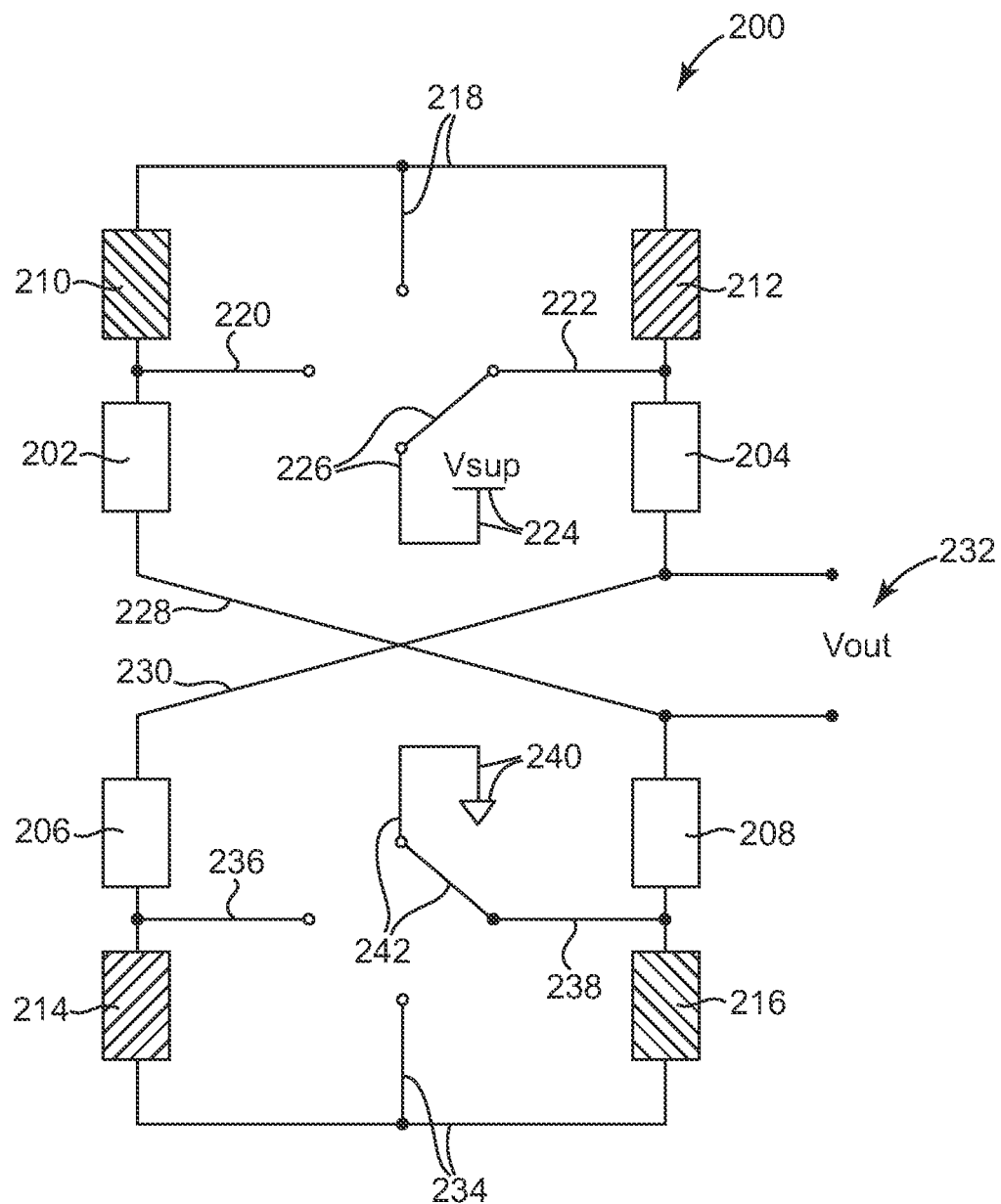
FIG. 6 is a diagram illustrating one embodiment of a sensor bridge that includes tap lines between XMR sensor elements.

FIG. 6 is a diagram illustrating one embodiment of a sensor bridge 200. Sensor bridge 200 includes taps or tap lines between XMR sensor elements, such that power is supplied to one of the tap lines and a reference is coupled to another one of the tap lines to increase and decrease resistances in sensor bridge 200 and reduce or eliminate the offset voltage Voffset. Sensor bridge 200 is a sensor circuit in a magnetic field sensor that is in an XMR speed sensor, such as sensor circuit 28 in magnetic field sensor 24 that is in XMR speed sensor 20 of FIG. 1. In other embodiments, sensor bridge 200 can be used in another suitable sensor, such as a proximity sensor, a motion sensor, or a position sensor.

Sensor bridge 200 has the topology of a Wheatstone bridge and includes first XMR sensor element 202, second XMR sensor element 204, third XMR sensor element 206, and fourth XMR sensor element 208. XMR sensor elements 202, 204, 206, and 208 are similar to XMR sensor elements 102, 104, 106, and 108 (shown in FIG. 5). Sensor bridge 200 also includes fifth XMR sensor element 210, sixth XMR sensor element 212, seventh XMR sensor element 214, and eighth XMR sensor element 216. XMR sensor elements 210, 212, 214, and 216 have smaller resistances than XMR sensor elements 202, 204, 206, and 208 and are switched in and out of the resistor divide networks of sensor bridge 200 to increase and decrease resistances. Each of the XMR sensor elements 202, 204, 206, 208, 210, 212, 214, and 216 is similar to one of the XMR sensor elements 30 and 32. In one embodiment, each of the XMR sensor elements 202, 204, 206, and 208 has a nominal resistance of (Rmax+Rmin)/2 in a magnetic field having an x-component that is substantially zero. In one embodiment, each of the XMR sensor elements 210, 212, 214, and 216 has a nominal resistance of ((Rmax+Rmin)/2)*(H/4) in a magnetic field having an x-component that is substantially zero.

One side of fifth XMR sensor element 210 is electrically coupled to one side of sixth XMR sensor element 212 via first tap line 218. The other side of fifth XMR sensor element 210 is electrically coupled to one side of first XMR sensor element 202 via second tap line 220, and the other side of sixth XMR sensor element 212 is electrically coupled to one side of second XMR sensor element 204 via third tap line 222. Power supply Vsup at 224 is electrically coupled to a fourth tap line 226 that can be electrically coupled to one of first tap line 218, second tap line 220, or third tap line 222.

The other side of first XMR sensor element 202 is electrically coupled to one side of fourth XMR sensor element 208 via first bridge line 228, and the other side of second XMR sensor element 204 is electrically coupled to one side of third XMR sensor element 206 via second bridge line 230. Sensor bridge 200 provides output voltage Vout at 232, which is the voltage difference between voltages on the first and second bridge lines 228 and 230.

One side of seventh XMR sensor element 214 is electrically coupled to one side of eighth XMR sensor element 216 via fifth tap line 234. The other side of seventh XMR sensor element 214 is electrically coupled to the other side of third XMR sensor element 206 via sixth tap line 236, and the other side of eighth XMR sensor element 216 is electrically coupled to the other side of fourth XMR sensor element 208 via seventh tap line 238. A reference, such as ground, at 240 is electrically coupled to an eighth tap line 242 that can be electrically coupled to one of fifth tap line 234, sixth tap line 236, or seventh tap line 238.

In this example, power supply Vsup at 224 is electrically coupled to third tap line 222 via fourth tap line 226 and reference 240 is electrically coupled to seventh tap line 238 via eighth tap line 242. The first resistor divide network includes sixth XMR sensor element 212, fifth XMR sensor element 210, first XMR sensor element 202, and fourth XMR sensor element 208. The second resistor divide network includes second XMR sensor element 204, third XMR sensor element 206, seventh XMR sensor element 214, and eighth XMR sensor element 216.

Sensor bridge 200 is held in a spaced apart and fixed position relative to a permanent magnet, such as permanent magnet 22, and relative to a toothed magnetically permeable disk, such as disk 26.

In one embodiment, the magnetic field through each of the first, third, fifth, and seventh XMR sensor elements 202, 206, 210, and 214 has a negative non-zero x-component and a non-zero y-component. The negative non-zero x-component negatively saturates the first, third, fifth, and seventh XMR sensor elements 202, 206, 210, and 214. As a result, each of the first, third, fifth, and seventh XMR sensor elements 202, 206, 210, and 214 provides the minimum resistance Rmin. The magnetic field through each of the second, fourth, sixth, and eighth XMR sensor elements 204, 208, 212, and 216 has an x-component that is substantially zero and a non-zero y-component. As a result, second, fourth, sixth, and eighth XMR sensor elements 204, 208, 212, and 216 are unsaturated and operate in their dynamic region.

With power supply Vsup at 224 electrically coupled to third tap line 222 and reference 240 electrically coupled to seventh tap line 238, the offset voltage Voffset is reduced or eliminated via increasing the resistance in the portions of the resistor divide networks in negative saturation. The resistance of fifth XMR sensor element 210 is added to the resistance of first XMR sensor element 202 and the resistance of seventh XMR sensor element 214 is added to the resistance of third XMR sensor element 206. Also, the offset voltage Voffset is reduced or eliminated via decreasing the resistance of the unsaturated portions of the resistor divide networks. The resistance of the sixth XMR sensor element 212 is not added to the resistance of second XMR sensor element 204 and the resistance of eighth XMR sensor element 216 is not added to the resistance of fourth XMR sensor element 208. In operation, the toothed magnetically permeable disk rotates and generates magnetic field variations. Sensor bridge 200 detects the magnetic field variations and provides output voltage Vout at 232, which is the voltage difference between voltages on the first and second bridge lines 228 and 230.

In one embodiment, the magnetic field through each of the first, third, fifth, and seventh XMR sensor elements 202, 206, 210, and 214 has an x-component that is substantially zero and a non-zero y-component. As a result, each of the first, third, fifth, and seventh XMR sensor elements 202, 206, 210, and 214 are unsaturated and operate in their dynamic region. The magnetic field through each of the second, fourth, sixth, and eighth XMR sensor elements 204, 208, 212, and 216 has a positive non-zero x-component and a non-zero y-component. The positive non-zero x-component positively saturates the second, fourth, sixth, and eighth XMR sensor elements 204, 208, 212, and 216. As a result, second, fourth, sixth, and eighth XMR sensor elements 204, 208, 212, and 216 provide the maximum resistance Rmax.

With power supply Vsup at 224 electrically coupled to third tap line 222 and reference 240 electrically coupled to seventh tap line 238, the offset voltage Voffset is reduced or eliminated via decreasing the resistance in the portions of the resistor divide networks in positive saturation. The resistance of the sixth XMR sensor element 212 is not added to the resistance of second XMR sensor element 204 and the resistance of eighth XMR sensor element 216 is not added to the resistance of fourth XMR sensor element 208. Also, the offset voltage Voffset is reduced or eliminated via increasing the resistance of the unsaturated portions of the resistor divide networks. The resistance of fifth XMR sensor element 210 is added to the resistance of first XMR sensor element 202 and the resistance of seventh XMR sensor element 214 is added to the resistance of third XMR sensor element 206. In operation, the toothed magnetically permeable disk rotates and generates magnetic field variations detected via sensor bridge 200, which provides output voltage Vout at 232.

Figure 7:
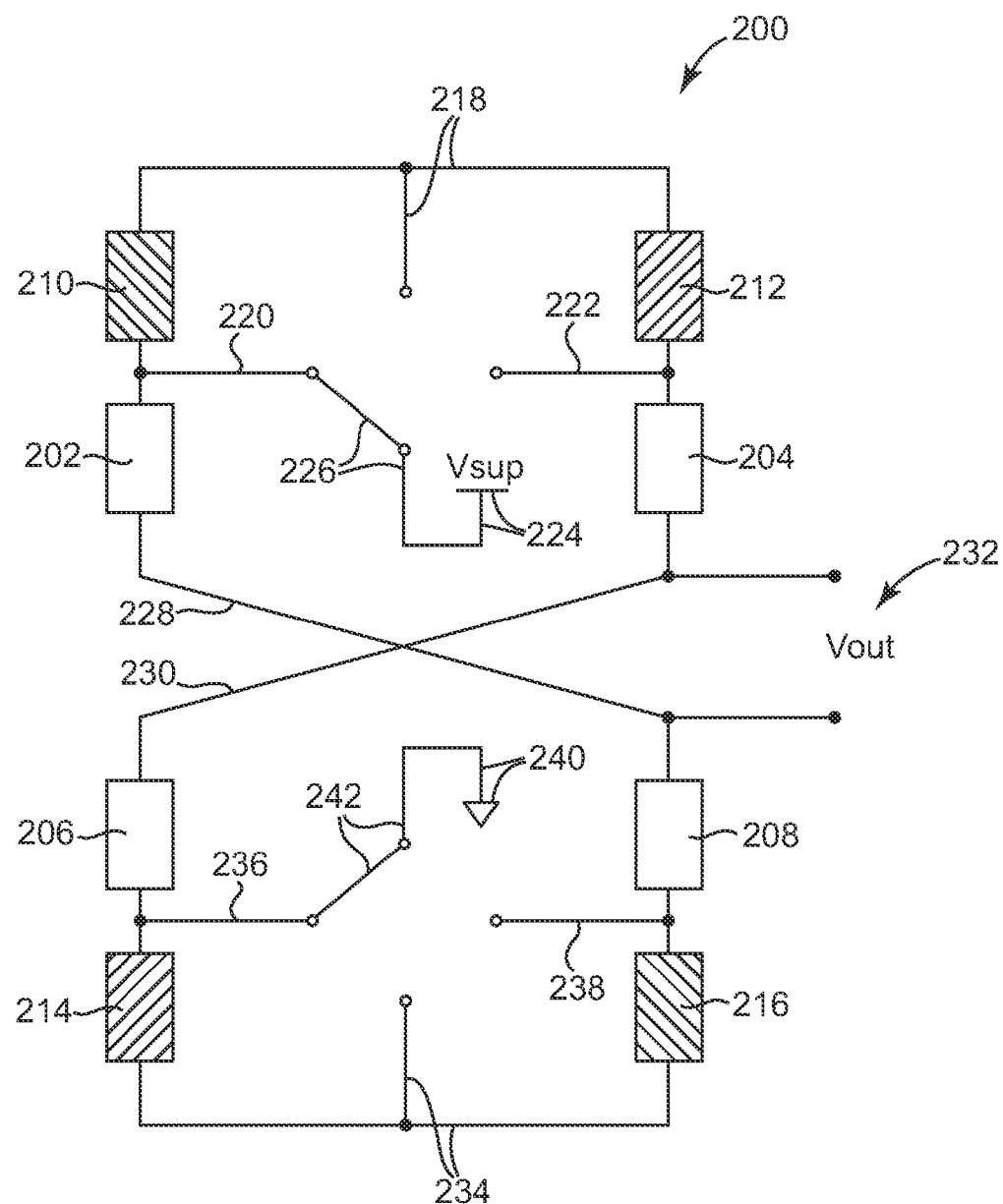
FIG. 7 is a diagram illustrating another embodiment of the sensor bridge of FIG. 6.

FIG. 7 is a diagram illustrating one embodiment of sensor bridge 200, wherein power supply Vsup at 224 is electrically coupled to second tap line 220 via fourth tap line 226. Reference 240 is electrically coupled to sixth tap line 236 via eighth tap line 242. The first resistor divide network includes first XMR sensor element 202, fourth XMR sensor element 208, eighth XMR sensor element 216, and seventh XMR sensor element 214. The second resistor divide network includes fifth XMR sensor element 210, sixth XMR sensor element 212, second XMR sensor element 204, and third XMR sensor element 206.

Sensor bridge 200 is held in a spaced apart and fixed position relative to a permanent magnet, such as permanent magnet 22, and relative to a toothed magnetically permeable disk, such as disk 26.

In one embodiment, the magnetic field through each of the first, third, fifth, and seventh XMR sensor elements 202, 206, 210, and 214 has a positive non-zero x-component and a non-zero y-component. The positive non-zero x-component positively saturates the first, third, fifth, and seventh XMR sensor elements 202, 206, 210, and 214. As a result, each of the first, third, fifth, and seventh XMR sensor elements 202, 206, 210, and 214 provides the maximum resistance Rmax. The magnetic field through each of the second, fourth, sixth, and eighth XMR sensor elements 204, 208, 212, and 216 has an x-component that is substantially zero and a non-zero y-component. As a result, second, fourth, sixth, and eighth XMR sensor elements 204, 208, 212, and 216 are unsaturated and operate in their dynamic region.

With power supply Vsup at 224 electrically coupled to second tap line 220 and reference 240 electrically coupled to sixth tap line 236, the offset voltage Voffset is reduced or eliminated via decreasing the resistance in the portions of the resistor divide networks in positive saturation. The resistance of the fifth XMR sensor element 210 is not added to the resistance of first XMR sensor element 202 and the resistance of seventh XMR sensor element 214 is not added to the resistance of third XMR sensor element 206. Also, the offset voltage Voffset is reduced or eliminated via increasing the resistance of the unsaturated portions of the resistor divide networks. The resistance of sixth XMR sensor element 212 is added to the resistance of second XMR sensor element 204 and the resistance of eighth XMR sensor element 216 is added to the resistance of fourth XMR sensor element 208. In operation, the toothed magnetically permeable disk rotates and generates magnetic field variations detected via sensor bridge 200, which provides output voltage Vout at 232.

In one embodiment, the magnetic field through each of the first, third, fifth, and seventh XMR sensor elements 202, 206, 210, and 214 has an x-component that is substantially zero and a non-zero y-component. As a result, each of the first, third, fifth, and seventh XMR sensor elements 202, 206, 210, and 214 are unsaturated and operate in their dynamic region. The magnetic field through each of the second, fourth, sixth, and eighth XMR sensor elements 204, 208, 212, and 216 has a negative non-zero x-component and a non-zero y-component. The negative non-zero x-component negatively saturates the second, fourth, sixth, and eighth XMR sensor elements 204, 208, 212, and 216. As a result, second, fourth, sixth, and eighth XMR sensor elements 204, 208, 212, and 216 provide the minimum resistance Rmin.

With power supply Vsup at 224 electrically coupled to second tap line 220 and reference 240 electrically coupled to sixth tap line 236, the offset voltage Voffset is reduced or eliminated via increasing the resistance in the portions of the resistor divide networks in negative saturation. The resistance of sixth XMR sensor element 212 is added to the resistance of second XMR sensor element 204 and the resistance of eighth XMR sensor element 216 is added to the resistance of fourth XMR sensor element 208. Also, the offset voltage Voffset is reduced or eliminated via decreasing the resistance of the unsaturated portions of the resistor divide networks. The resistance of the fifth XMR sensor element 210 is not added to the resistance of first XMR sensor element 202 and the resistance of seventh XMR sensor element 214 is not added to the resistance of third XMR sensor element 206. In operation, the toothed magnetically permeable disk rotates and generates magnetic field variations. Sensor bridge 200 detects the magnetic field variations and provides output voltage Vout at 232, which is the voltage difference between voltages on the first and second bridge lines 228 and 230.

Figure 8:
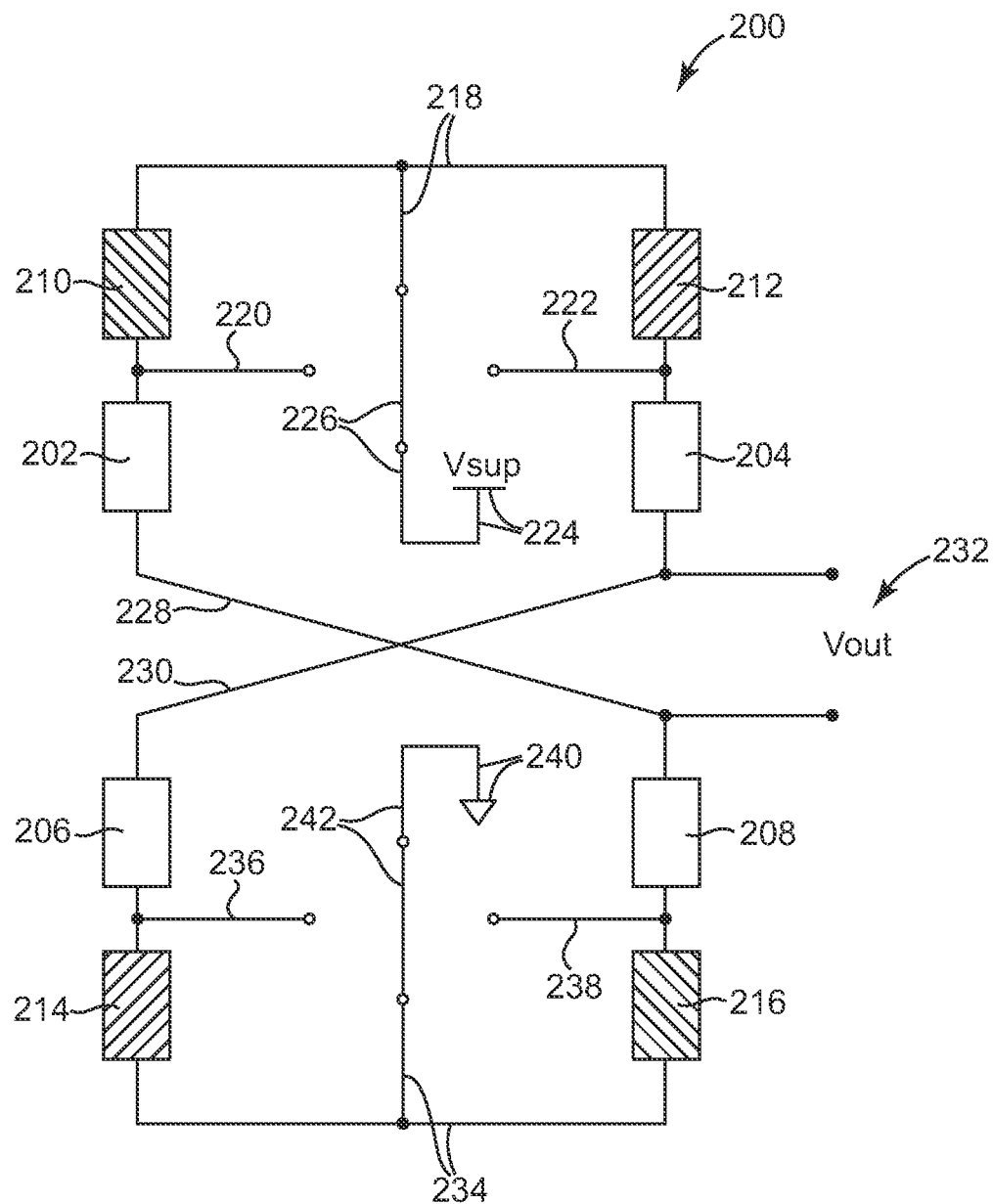
FIG. 8 is a diagram illustrating one embodiment of a sensor bridge that has balanced resistor divide networks.

FIG. 8 is a diagram illustrating one embodiment of sensor bridge 200, wherein power supply Vsup at 224 is electrically coupled to first tap line 218 via fourth tap line 226, and reference 240 is electrically coupled to fifth tap line 234 via eighth tap line 242. The first and second resistor divide networks are balanced, where the first resistor divide network includes fifth XMR sensor element 210, first XMR sensor element 202, fourth XMR sensor element 208, and eighth XMR sensor element 216, and the second resistor divide network includes sixth XMR sensor element 212, second XMR sensor element 204, third XMR sensor element 206, and seventh XMR sensor element 214.

Sensor bridge 200 is held in a spaced apart and fixed position relative to a permanent magnet, such as permanent magnet 22, and relative to a toothed magnetically permeable disk, such as disk 26. The magnetic field through each of the first, third, fifth, and seventh XMR sensor elements 202, 206, 210, and 214 has an x-component that is substantially zero and a non-zero y-component. Also, the magnetic field through each of the second, fourth, sixth, and eighth XMR sensor elements 204, 208, 212, and 216 has an x-component that is substantially zero and a non-zero y-component. As a result, the first, third, fifth, and seventh XMR sensor elements 202, 206, 210, and 214 are unsaturated and operate in their dynamic region and the second, fourth, sixth, and eighth XMR sensor elements 204, 208, 212, and 216 are unsaturated and operate in their dynamic region.

With power supply Vsup at 224 electrically coupled to first tap line 218 and reference 240 electrically coupled to fifth tap line 234, the offset voltage Voffset is reduced or eliminated via the balanced resistor divide networks. In operation, the toothed magnetically permeable disk rotates and generates magnetic field variations detected via sensor bridge 200, which provides output voltage Vout at 232.

Figure 9:
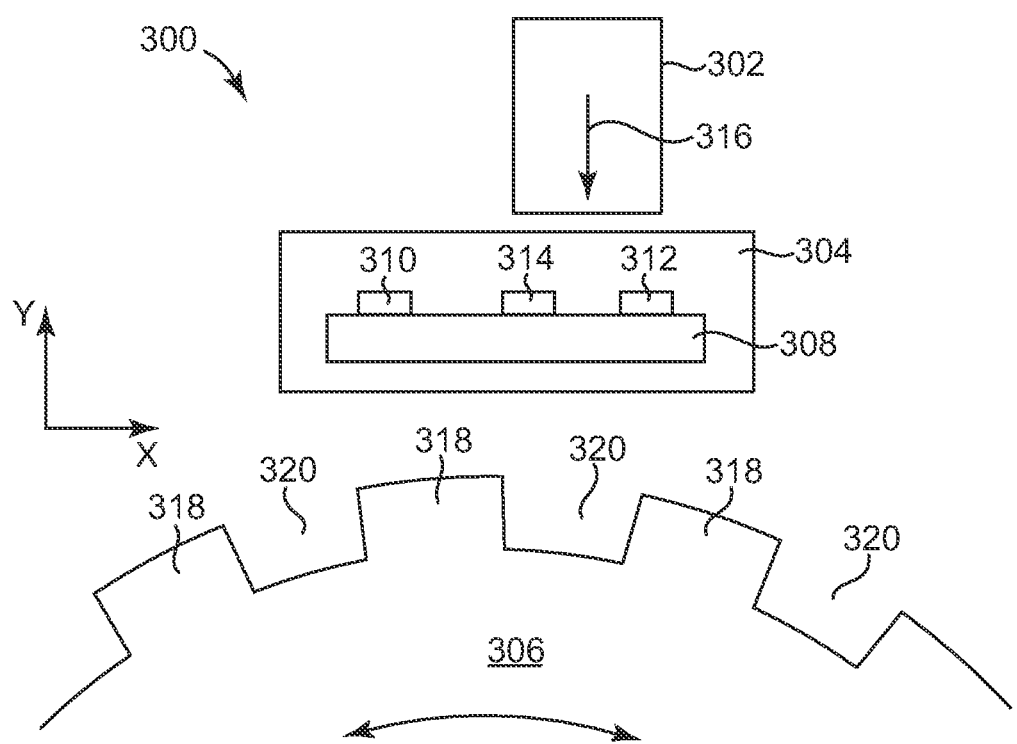
FIG. 9 is a diagram illustrating one embodiment of an XMR speed sensor that includes direction detection.

FIG. 9 is a diagram illustrating one embodiment of an XMR speed sensor 300 that includes direction detection. Permanent magnet 302 is situated next to magnetic field sensor 304 that is in spaced apart relation to toothed magnetically permeable disk 306. Permanent magnet 302 and magnetic field sensor 304 are held in a fixed position relative to each other. In one embodiment, magnetic field sensor 304 and toothed magnetically permeable disk 306 are held in a fixed position relative to each other.

Magnetic field sensor 304 includes a sensor circuit 308 that includes a first XMR sensor element 310, a second XMR sensor element 312, and a third XMR sensor element 314. Third XMR sensor element 314 is halfway between first XMR sensor element 310 and second XMR sensor element 312. Permanent magnet 302 and XMR sensor elements 310, 312, and 314 are held in a fixed position relative to each other. In one embodiment, sensor circuit 308 is an integrated circuit chip. In one embodiment, each of the XMR sensor elements 310, 312, and 314 is an AMR sensor element. In one embodiment, each of the XMR sensor elements 310, 312, and 314 is a GMR sensor element. In one embodiment, each of the XMR sensor elements 310, 312, and 314 is a TMR sensor element. In one embodiment, each of the XMR sensor elements 310, 312, and 314 is a CMR sensor element.

Permanent magnet 302 provides back bias magnetic field 316 that is superimposed on XMR sensor elements 310, 312, and 314. Permanent magnet 302 is centered halfway between second XMR sensor element 312 and third XMR sensor element 314. Magnetic field 316 provides diverging magnetic field lines that flow through first XMR sensor element 310. The diverging magnetic field lines through first XMR sensor element 310 have a negative non-zero x-direction component and a non-zero y-direction component. Magnetic field 316 provides magnetic field lines that flow through second XMR sensor element 312 and third XMR sensor element 314 in the y-direction. The magnetic field lines that flow through second XMR sensor element 312 and third XMR sensor element 314 have a small non-zero x-direction component that does not saturate second XMR sensor element 312 and third XMR sensor element 314. As a result, first XMR sensor element 30 is saturated and second and third XMR sensor elements 312 and 314 operate in unsaturated regions. In other embodiments, each of the XMR sensor elements 310, 312, and 314 operate in an unsaturated region.

Toothed magnetically permeable disk 306 includes teeth 318 and gaps 320. Disk 306 rotates in a clockwise direction or a counter-clockwise direction.

In operation, as disk 306 rotates the teeth 318 and gaps 320 pass through magnetic field 316 and create magnetic field variations in magnetic field 316. The magnetic field variations include x-direction components that are detected via second XMR sensor element 312 and third XMR sensor element 314. These magnetic field variations include information about rotational speed and angular position of rotating disk 306. In addition, magnetic field sensor 304 detects the direction of rotation of disk 306 via XMR sensor elements 310, 312, and 314.

Speed sensor 300 includes permanent magnet 302 positioned to provide magnetic field lines that flow through second XMR sensor element 312 and third XMR sensor element 314 and that have non-zero x-direction components that are small enough to not saturate second XMR sensor element 312 and third XMR sensor element 314. Thus, second XMR sensor element 312 and third XMR sensor element 314 are unsaturated and biased to detect variations in magnetic field 316.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
a magnet configured to provide a magnetic field having a substantially non-diverging magnetic field line and diverging magnetic field lines;
a first magneto-resistive sensing element situated in the magnetic field; and
a second magneto-resistive sensing element situated in the magnetic field, wherein the first magneto-resistive sensing element is intersected at a centerline of the first magneto-resistive sensing element by the substantially non-diverging magnetic field line and the second magneto-resistive sensing element is intersected by only the diverging magnetic field lines of the magnetic field and the magnitude of the x-component of the magnetic field through the second magneto-resistive sensing element divided by the magnitude of the x-component of the magnetic field through the first magneto-resistive sensing element is greater than 2, and the first magneto-resistive sensing element is responsive to positive and negative values of the x-component of the magnetic field and provides different first resistance for positive and negative values of the same magnitude of the x-component of the magnetic field and the second magneto-resistive sensing element is responsive to positive and negative values of the x-component of the magnetic field and provides different second resistances for positive and negative values of the same magnitude of the x-component of the magnetic field.

2. The system of claim 1, comprising a toothed magnetically permeable wheel configured to rotate in the magnetic field and provide a modulated magnetic field, wherein the first magneto-resistive sensing element responds to the modulated magnetic field and the second magneto-resistive sensing element is saturated by the diverging magnetic field lines of the magnetic field and remains saturated in the modulated magnetic field.

3. A system comprising:
a magnet configured to provide a magnetic field having a substantially non-diverging magnetic field line and diverging magnetic field lines;
a first magneto-resistive sensing element situated in the magnetic field;
a second magneto-resistive sensing element situated in the magnetic field; and
a toothed magnetically permeable wheel configured to rotate in the magnetic field and provide a modulated magnetic field, wherein the substantially non-diverging magnetic field line intersects the first magneto-resistive sensing element at a centerline of the first magneto-resistive sensing element and the diverging magnetic field lines intersect the second magneto-resistive sensing element such that the first magneto-resistive sensing element is responsive to the modulated magnetic field and the second magneto-resistive sensing element is saturated by the diverging magnetic field lines of the magnetic field and remains saturated in the modulated magnetic field, and the first magneto-resistive sensing element is responsive to positive and negative values of the magnetic field in a direction of the magnetic field that is orthogonal to the substantially non-diverging magnetic field line and provides different resistances for positive and negative values of the same magnitude of the magnetic field in the direction of the magnetic field that is orthogonal to the substantially non-diverging magnetic field line.

4. A system comprising:
a magnet that provides a magnetic field having a non-diverging magnetic field line and diverging magnetic field lines;
a first magneto-resistive sensing element situated in the magnetic field and responsive to positive and negative values of the magnetic field in a direction of the magnetic field that is orthogonal to the non-diverging magnetic field line to provide different first resistances for positive and negative values of the same magnitude of the magnetic field in the direction of the magnetic field that is orthogonal to the non-diverging magnetic field line;
a second magneto-resistive sensing element situated in the magnetic field; and
a toothed magnetically permeable wheel configured to rotate in the magnetic field and provide a modulated magnetic field, wherein the first magneto-resistive sensing element is responsive to the modulated magnetic field in the direction of the magnetic field that is orthogonal to the non-diverging magnetic field line and the second magneto-resistive sensing element provides a constant reference resistance in the modulated magnetic field.

5. The system of claim 4, wherein the second magneto-resistive sensing element is responsive to positive and negative values of the magnetic field in the direction of the magnetic field that is orthogonal to the non-diverging magnetic field line to provide different second resistances for positive and negative values of the same magnitude of the magnetic field in the direction of the magnetic field that is orthogonal to the non-diverging magnetic field line.

6. The system of claim 4, wherein the second magnetoresistive sensing element is saturated by the diverging magnetic field lines to provide the constant reference resistance.

\* \* \* \* \*